United States Patent [19]

Van Vuuren

[11] Patent Number: 5,232,055
[45] Date of Patent: Aug. 3, 1993

[54] DEVICE FOR CARRYING A LOAD

[76] Inventor: Johannes Van Vuuren, Harmelerwaard 21, NL-3481 LC Harmelen, Netherlands

[21] Appl. No.: 728,625

[22] Filed: Jul. 11, 1991

[30] Foreign Application Priority Data

Jul. 18, 1990 [NL] Netherlands .......... 9001635

[51] Int. Cl.$^5$ ............................ A01B 63/22
[52] U.S. Cl. .................... 172/318; 172/19; 172/395; 172/445; 280/43.23; 280/46; 414/920
[58] Field of Search ............. 172/19, 20, 310, 318, 172/321, 395, 445; 280/43.23, 43.24, 46; 414/920, 476

[56] References Cited

U.S. PATENT DOCUMENTS

| 1,280,795 | 10/1918 | Martin .................. 280/46 |
| 2,560,206 | 7/1951 | Beatty . | |
| 2,595,289 | 5/1952 | Peterson .............. 172/318 X |
| 2,714,846 | 8/1955 | Robinson et al. ............ 172/318 |
| 2,803,359 | 8/1957 | Pokorny . | |
| 2,972,426 | 2/1961 | Sanford ............... 414/476 |
| 3,059,706 | 10/1962 | Morkoski et al. ........ 172/318 X |
| 3,653,448 | 4/1972 | Morrill ................ 172/19 |
| 3,878,959 | 4/1975 | Holdeman et al. ......... 414/476 X |
| 4,595,210 | 6/1986 | Groeing .............. 280/43.23 |
| 4,828,040 | 5/1989 | Schumacher .......... 172/19 |
| 4,892,152 | 1/1990 | van Vuuren .......... 172/20 |
| 4,940,110 | 7/1990 | Svensson et al. ...... 280/43.23 X |

FOREIGN PATENT DOCUMENTS

| 1400105 | 7/1964 | France . | |
| 606778 | 7/1960 | Italy ............... 172/318 |
| 8701921 | 3/1989 | Netherlands . | |
| 1183992 | 3/1970 | United Kingdom . | |
| 1534503 | 12/1978 | United Kingdom . | |

Primary Examiner—David H. Corbin
Assistant Examiner—Spencer Warnick
Attorney, Agent, or Firm—Webb, Burden, Ziesenheim & Webb

[57] ABSTRACT

Device for carrying a load behind a vehicle, comprising:
a frame whereon the load is to be placed;
one or more support wheels for supporting the frame; and
one or more arms for causing one or more shafts of the support wheels to move between a first position wherein the frame rests on a ground and a second position wherein the frame (and the load) are at least partially supported by the support wheels.

8 Claims, 4 Drawing Sheets

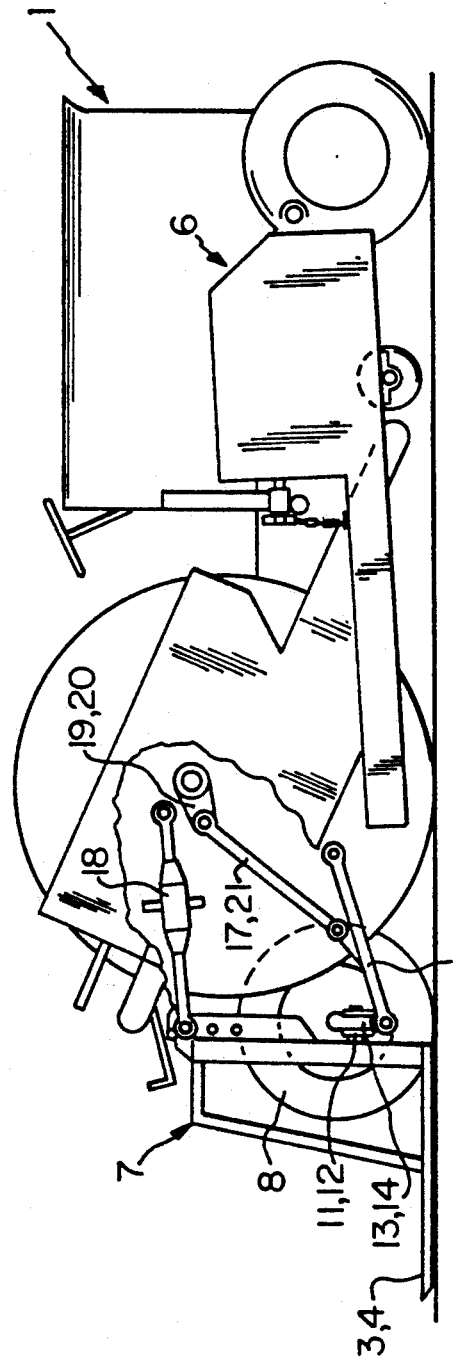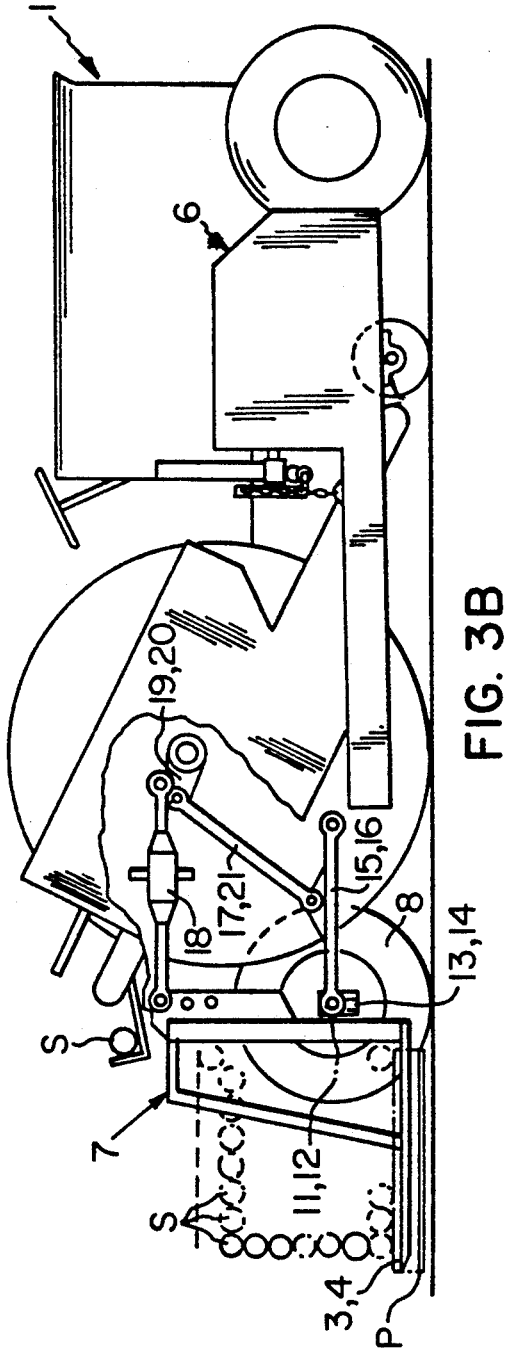

DEVICE FOR CARRYING A LOAD

BACKGROUND OF THE INVENTION

Known from the prior art are various bearing devices, in particular for carrying a load behind an agricultural tractor such as a trailer provided with two or four wheels for supporting heavy and/or bulky loads wherein however loading and unloading of the load is labour intensive, and such as up and downward movable carrying means which are arranged "floating" behind a vehicle, wherein however the load for carrying is limited in weight, for example because of the danger of the vehicle tipping over backwards.

SUMMARY OF THE INVENTION

The present invention provides a device for bearing a load behind a vehicle, comprising:
   a frame whereon the load is to be placed;
   two or more support wheels for supporting the frame; and
   one or more pivot shafts for causing one or more shafts of the support wheels to pivot between a first position wherein the frame rests on a ground and a second position wherein the frame (and the load) are at least partially supported by the support wheels.

The carrying device according to the present invention facilitates loading and unloading the load and is capable of bearing a relatively large load.

The frame is preferably provided with tine elements which can be placed into a pallet for the load.

The carrying device is preferably coupled to a cutting device for cutting grass sods and is movably coupled thereto, as the cutting device must follow accurately the ground surface from which the grass sods have to be cut, wherein it is the intention that movements of the carrying device do not occur.

According to another aspect of the present invention a combination is provided of a tractor, a cutting device and a carrying device, wherein the carrying device and the cutting device can be coupled to a tractor of any random make, which means that a tractor already in the possession of a user can be used not only for cutting grass sods but also for other purposes.

BRIEF DESCRIPTION OF THE DRAWINGS

Further advantages, characteristics and details of the present invention will be elucidated in the light of a description of preferred embodiments thereof with reference to the annexed drawings in which:

FIGS. 3A-3B show partially broken away schematic side views of the preferred embodiment of FIG. 1 in a first resting position and a second operational position;

DESCRIPTION OF THE PREFERRED EMBODIMENTS

Figure 1:
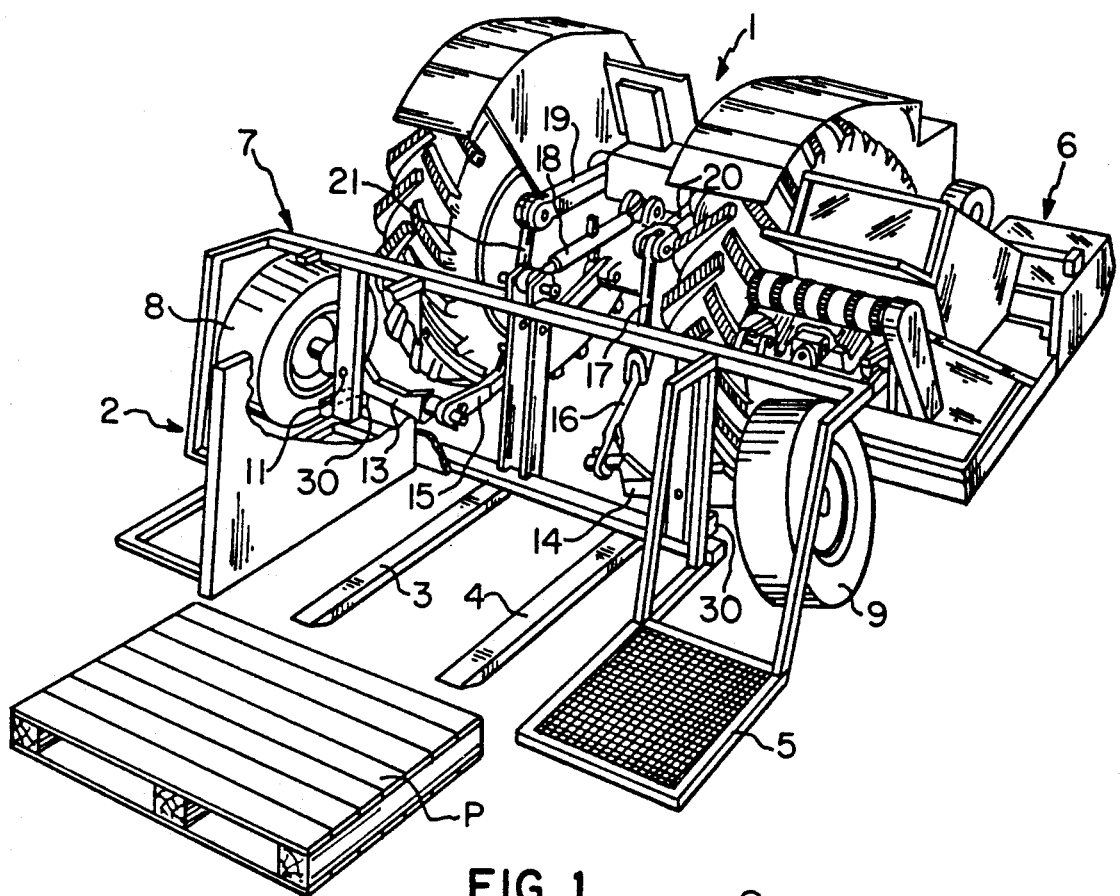
FIG. 1 shows a perspective rear view of a first preferred embodiment of a carrying device according to the present invention.

Arranged behind a tractor or vehicle 1 (FIG. 1) is a frame 2 which is provided with two tine elements 3, 4 which in the position shown in FIG. 1 can be inserted into a pallet P. The frame 2 is provided with a platform 5 on which a person can stand for inspecting a sod cut from grassland using a cutting device designated schematically with 6 and for conveying thereof to the pallet. With the embodiment shown, which is of very compact construction, it is however also possible for this conveying to be performed by the driver of the tractor 1.

In addition to a frame 2, a carrying device 7 is formed by two wheels 8, 9 which are pivotably coupled via shafts 11, 12 and pivot arms 13, 14 to further arms 15, 16. Pivot arms 13, 14 are connected via further rods 17, 18, 19, 20 and 21 to the so-called three-point suspension of the tractor 1.

It can be seen particularly in the FIGS. 3A and 3B that, using the hydraulic lifting means (not further shown) of the tractor, arms 19 and 20 are carried up to the position shown in FIG. 3B, wherein the arm 15 (and the arm 14) are moved upward, wherewith the wheels 8, 9 in FIG. 1 are carried into a straight position and are suitable for supporting the load to be placed on the pallet P as indicated by rolled-up grass sods S. The movement of the pivot arms 13 and 14 is limited by stops 30.

In the position shown in FIG. 1 a full pallet can easily be unloaded and/or an empty pallet picked up; although the wheels 8, 9 in FIG. 1 are in a slightly inclined position they can still be driven over not too great a distance.

FIG. 3B shows the normal position for driving and for cutting out the grass sods. As can likewise be seen in FIG. 3B, the grass sod cutting device 6 is then situated in the downward position. The cutting device 6 is movable between a raised position and a bottom operating position using a hydraulic cylinder 22.

In a further (not shown) embodiment a chain is arranged between arm 25 and 26, so that uncoupling of the cutting device becomes even more simple. According to this embodiment the upper and lower arms do not extend any further sideways than the rear wheel of the tractor. When the lower arm extends underneath the cutting unit, this unit can be lifted by pivoting the upper arm.

Figure 2:
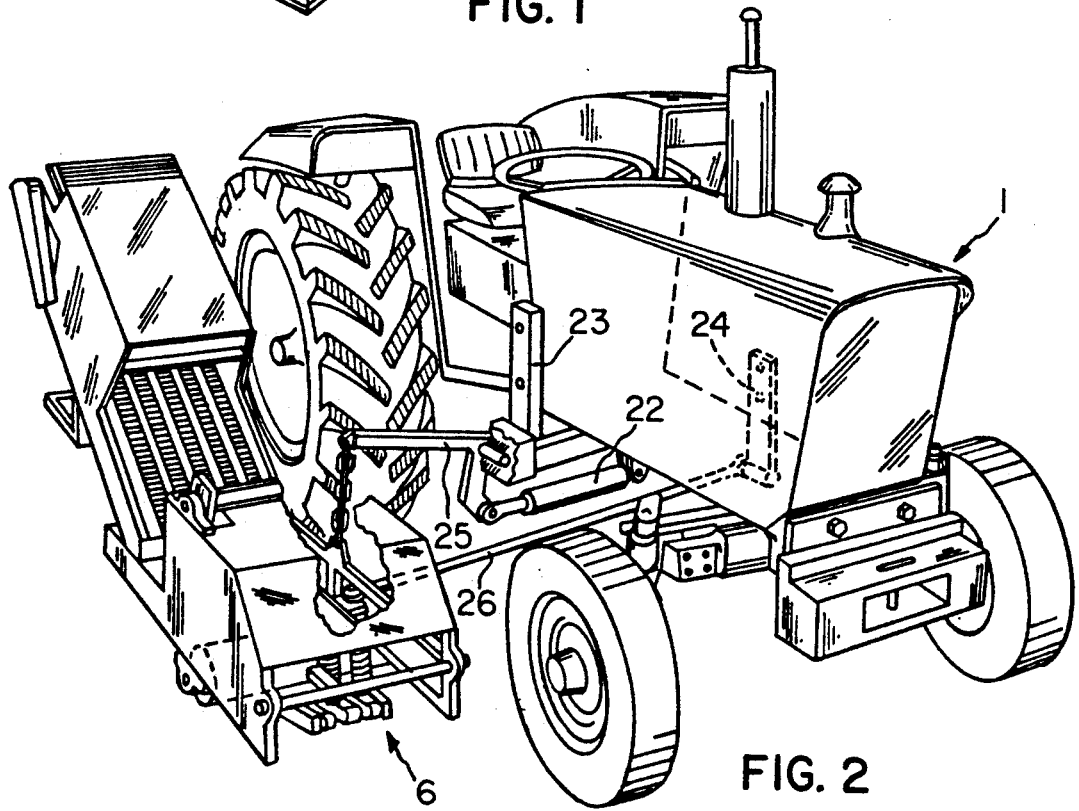
FIG. 2 shows a front view of the preferred embodiment of FIG. 1.

It can further be seen in FIG. 2 that a tractor 1 is provided with relatively simply embodied mounting means 23, 24 to which arms 25, 26 are fixed so that the cutting device 6 in combination with the carrying device 7 can be mounted in a simple manner to almost any known tractor. This reduces the investment in a grass sod cutter by perhaps around 50% relative to existing systems, wherein a specially adapted tractor is required.

It can also be seen in FIG. 1 that the cutting device 6 and carrying device 7 are coupled by means of movably embodied, per se known coupling means enabling the movement between the carrying device 7 and the cutting device 6, so that the cutting device can easily follow the gradients and inclines of a ground surface without the carrying device, possibly with a heavy load thereon, having to follow these movements.

In preference the movable coupling between cutting device and carrying device takes a releasable form, in a manner not shown here, for example by means of a ball joint slidable on and off a pin.

Figure 4:
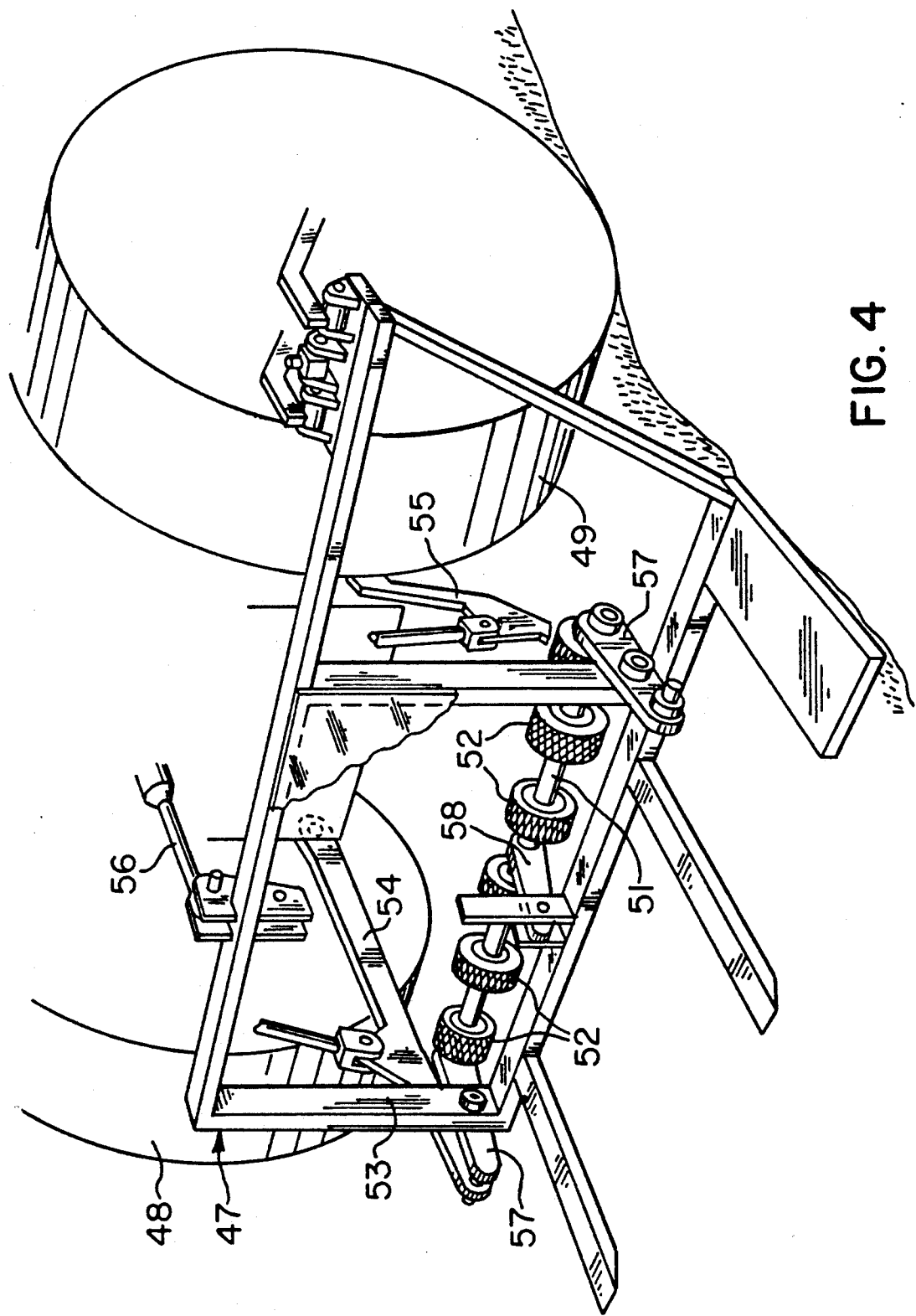
FIG. 4 shows a schematic rear view in perspective of a second preferred embodiment according to the present invention.

In a second embodiment according to the present invention (FIG. 4) a carrying device. 47 is provided with a shaft 51 which is arranged between rear wheels 48 and 49 of a tractor and provided with relatively small wheels 52, wherein a frame 53 is connected to a three-point suspension via arms 54, 55 and 56. Via pivot arms 57 and 58 the shaft 51 pivots between a position wherein the wheels 52 roll over a ground surface and a position wherein they fulfil a supporting function for a carrying device 47.

The second embodiment according to the present invention decreases the breadth of the vehicle provided therewith, which facilitates maneuvering and the like.

In a third embodiment according to the present invention a load carrying device 60 comprises a frame 61 with two tine elements 62. Two support wheels 63 are arranged on the same continuous shaft 64. Using pivot arms 66, 67 the frame 61 is movable up and down relative to the shaft (and the support wheels). When arms 68 are moved upwards using rods 69, the frame pivotally suspended on a third arm (not shown) is moved upwards.

The shaft 64 is fixed in transverse direction by means of stops 71. Shaft 64 is enclosed between the pivot arms, plates 65 welded fixedly to the shaft and screw bolts 70. Stops 72 bound the movement of pivot arms 66, 67 relative to bearing rollers 73, 74 so that with further lifting the wheels can also be raised from the ground, for example for transporting.

Figure 5:
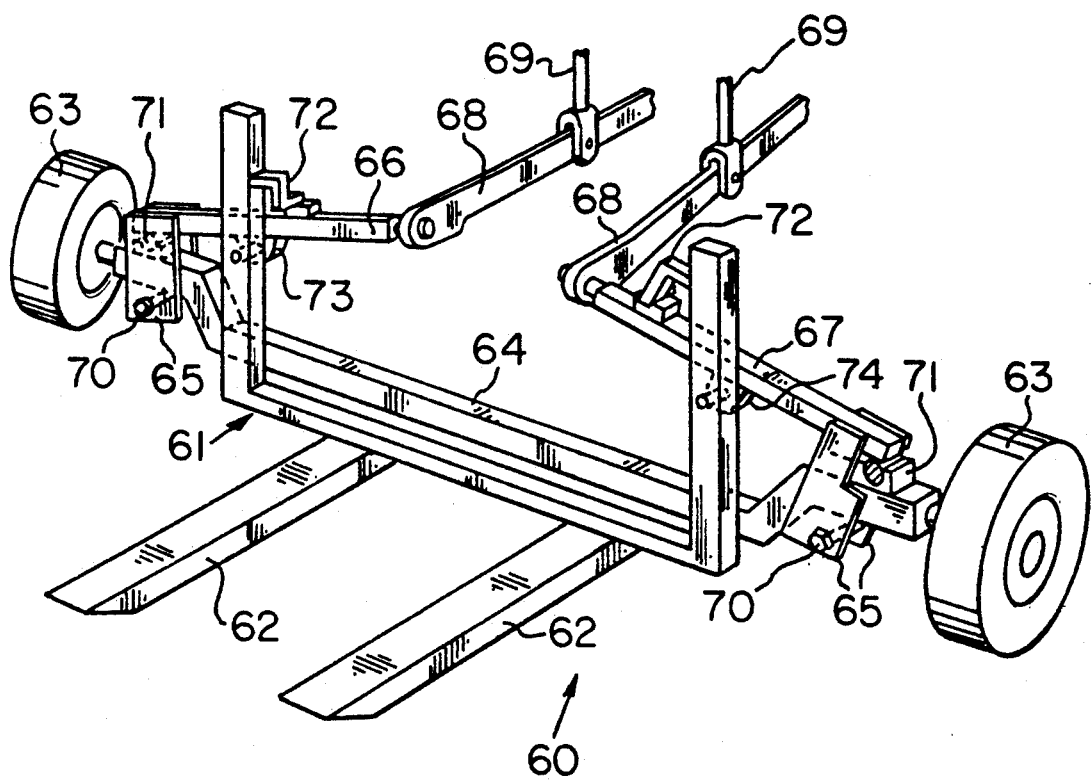
FIG. 5 shows a perspective rear view of a third preferred embodiment according to the present invention.

In the embodiment shown in FIG. 5 the wheels 63 remain upright.

The combination according to the present invention, consisting of a tractor, cutting device and carrying device is easy to assemble and disassemble, which facilitates transportation.

I claim:

1. A device for carrying a load behind a vehicle, comprising:
   a frame whereon the load is to be placed;
   at least one support wheel mounted on a shaft for supporting said frame;
   at least one pivot arm for causing said shaft of said at least one support wheel to move said at least one support wheel substantially vertically relative to said frame between a first position wherein said frame rests on the ground and a second position wherein said frame is at least partially supported by said at least one support wheel, wherein one end of each said pivot arm is coupled to said shaft of said at least one support wheel and a middle section of each said pivot arm pivots about a roller attached to said frame; and
   at least one stop attached to said frame and engagable with said at least one pivot arm to limit the movement of said at least one pivot arm relative to said roller in a first direction, whereby further movement of said at least one pivot arm in said first direction will lift said device.

2. Carrying device as claimed in claim 1, wherein said frame is provided with tine elements for placing into openings of a pallet.

3. Carrying device as claimed in claim 1, wherein said frame is movably coupled to a cutting device for grass sods.

4. A carrying device as claimed in claim 3, wherein said at least one pivot arm is mountable to a three-point suspension of a tractor.

5. Carrying device as claimed in claim 1, wherein two support wheels are suspended on a common shaft.

6. A carrier as claimed in claim 1, further including a pair of plates attached to said one end of each said pivot arm with a bolt extending between said pair of plates, whereby said shaft of said at least one support wheel is enclosed between said pivot arm, said pair of plates, and said bolt.

7. In combination:
   a tractor;
   a carrying device having a frame whereon a load may be placed, at least one support wheel mounted on a shaft for supporting said frame, at least one pivot arm for causing said shaft of said at least one support wheel to move said at least one support wheel substantially vertically relative to said frame between a first position wherein said frame rests on the ground and a second position wherein said frame and the load are at least partially supported by said at least one support wheel, wherein one end of each said pivot arm is coupled to said shaft of said at least one support wheel and a middle section of each said pivot arm pivots about a roller attached to said frame, at least one stop attached to said frame and engagable with said at least one pivot arm to limit the movement of said at least one pivot arm relative to said roller in a first direction, whereby further movement of said at least one pivot arm in said first direction will lift said carrying device; and
   mounting means for attaching a cutting device on a front side of said tractor, said mounting means further including lifting means for raising said cutting device into as non-operational position.

8. The combination of claim 7, wherein a pair of plates are attached to said one end of each said pivot arm with a bolt extending between said pair of plates, whereby said shaft of said at least one support wheel is enclosed between said pivot arm, said pair of plates, and said bolt.

* * * * *